United States Patent [19]

Cohen et al.

[11] Patent Number: 4,514,802
[45] Date of Patent: Apr. 30, 1985

[54] INTEGRATED PROGRAM COUNTER MEMORY MANAGEMENT REGISTER AND INCREMENTER

[75] Inventors: Paul Cohen, Ashland, Mass.; William R. Young, Palm Bay, Fla.

[73] Assignee: Harris Corporation, Melbourne, Fla.

[21] Appl. No.: 363,815

[22] Filed: Mar. 31, 1982

[51] Int. Cl.³ .............................................. G06F 9/32
[52] U.S. Cl. ................................................. 364/200
[58] Field of Search .............................. 364/200, 900

[56] References Cited

U.S. PATENT DOCUMENTS

| | | | |
|---|---|---|---|
| 3,731,280 | 5/1973 | Shevlin | 364/200 |
| 3,969,724 | 7/1976 | Anderson et al. | 364/200 |
| 4,016,546 | 4/1977 | Bennett et al. | 364/200 |
| 4,290,106 | 9/1981 | Catiller et al. | 364/200 |
| 4,296,469 | 10/1981 | Gunter et al. | 364/200 |
| 4,434,461 | 2/1984 | Puhl | 364/200 |

*Primary Examiner*—Gareth D. Shaw
*Assistant Examiner*—Ronni S. Malamud
*Attorney, Agent, or Firm*—Barnes & Thornburg

[57] ABSTRACT

An integrated structure including a program counter, a memory management structure and an incrementer interconnected by an internal bus such that the logic value of the program counter may be read into the memory management register and the program counter can be incremented depending upon the value of the pre-incremented program counter logic level and an increment signal from the previous stage. External access to the program counter and the memory management register are provided by external buses. A sense amplifier is also provided so as to maintain the value of the pre-incremented program counter on the internal rail allowing the memory management register to be disconnected therefrom during the increment cycle.

13 Claims, 4 Drawing Figures

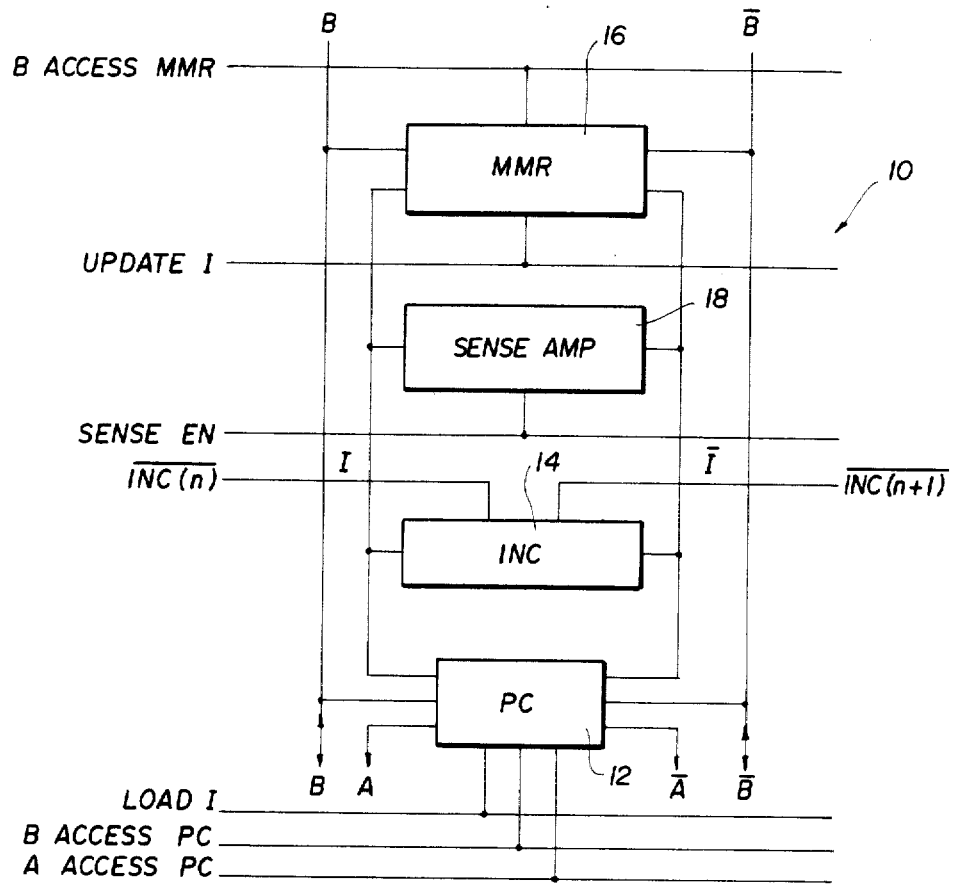
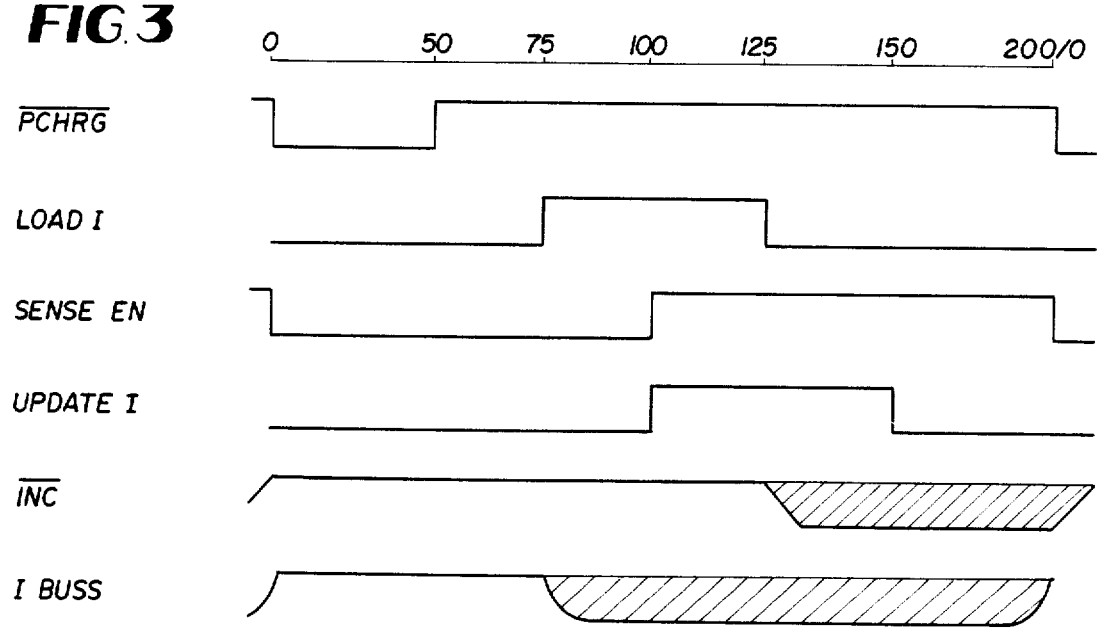

INTEGRATED PROGRAM COUNTER MEMORY MANAGEMENT REGISTER AND INCREMENTER

BACKGROUND OF THE INVENTION

The present invention relates generally to program counters and, more specfically, to an integrated structure for a program counter, a memory storage device and an incrementer system for the program counter.

In the architecture of a computer, a circuit called the program counter (PC) must be included. The program counter keeps track of the next instruction to be executed and must be incremented for each access and, also, must have the capability of being written into for special jump locations. In some designs, the program counter is a location in memory or in others there is a requirement that it be part of general register array. When the program counter is part of the memory array, the contents are read, incremented external to the array and then rewritten back into the memory. Where the program counter is part of a register array, the program counter must be connected so that it can be read from and into, like any other register, and still have the capability of being incremented. In either situation, a ALU must be used.

Another important element of the computer architecture is a memory management register (MMR) which is periodically updated with the contents of the program counter. This is used to store the address of the present instruction being operated upon such that if an interrupt or any other type of jump operation should occur, the address of the instruction at such interrupt may be retained since the program counter has already been incremented and includes the next instruction address. Thus, the memory management register must be capable of being read from as well as having the contents of the program counter written therein. As with the program counter, the memory management register generally is a register versus a location in memory.

In prior art designs, wherein the program counter is part of the general register array, the A and B buses of the array as well as the arithmetic logic unit (ALU) must be available to read and write into and out of the program counter and the memory management register as well as to increment the program counter. In certain designs, the A and B buses and the ALU are not available without providing a special cycle. This decreases the speed of operation of the computer and is, therefore, undesirable. Thus, there exists the need for a new architecture of a program counter and memory management register which is part of the register array which does not require any of the cycle time for the A and B bus as well as the ALU to perform the necessary writing of the program counter into the memory management register as well as incrementing the program counter.

SUMMARY OF THE INVENTION

An object of the present invention is to provide an integrated program counter, memory management register and incrementer circuit which operates independent of the A and B buses and ALU cycle.

Another object of the present invention is to provide an architecture for a program counter and memory management register which may be operated and incremented without decreasing the speed of the ALU and A and B bus cycle.

These and other objects of the present invention are attained by providing an integrated structure having a program counter, memory management register and incrementer interconnected to each other by an internal bus and controlled such that the contents of the program counter is written into the memory management register on the internal bus and the program counter can subsequently be incremented by the incrementer. The program counter and the memory management register are also connected to the external A and B buses of the register array. Since the program counter, memory management register and incrementer are integrated and have a private internal bus, the operation may be performed without using an additional cycle of computer operation and is normally performed during the normal read and write cycle of the A and B buses while the arithmetic logic unit is performing other operations. A sense amplifier is provided connected to the internal bus so as to sense the logic value of the program counter while it is connected to the bus to maintain that value on the bus after the program counter is disconnected from the bus and during the incrementing of the program counter. The incrementer increments the program counter as a function of a received increment signal and the logic value on the internal bus. The incrementer also provides an output increment signal as a function of a received increment signal and the logic value of the internal bus.

Other objects, advantages and novel features of the present invention will become evident from the following detailed description of the invention when considered in conjunction with the accompanying drawings.

BRIEF DESCRIPTION OF THE DRAWINGS

FIG. 1 is a block diagram of an integrated program counter, memory management register and incrementer incorporating the principles of the present invention.

FIG. 3 is a graph of signals to control the integrated program counter, memory management register and incrementer of FIG. 2.

DESCRIPTION OF THE PREFERRED EMBODIMENTS

Figure 2:
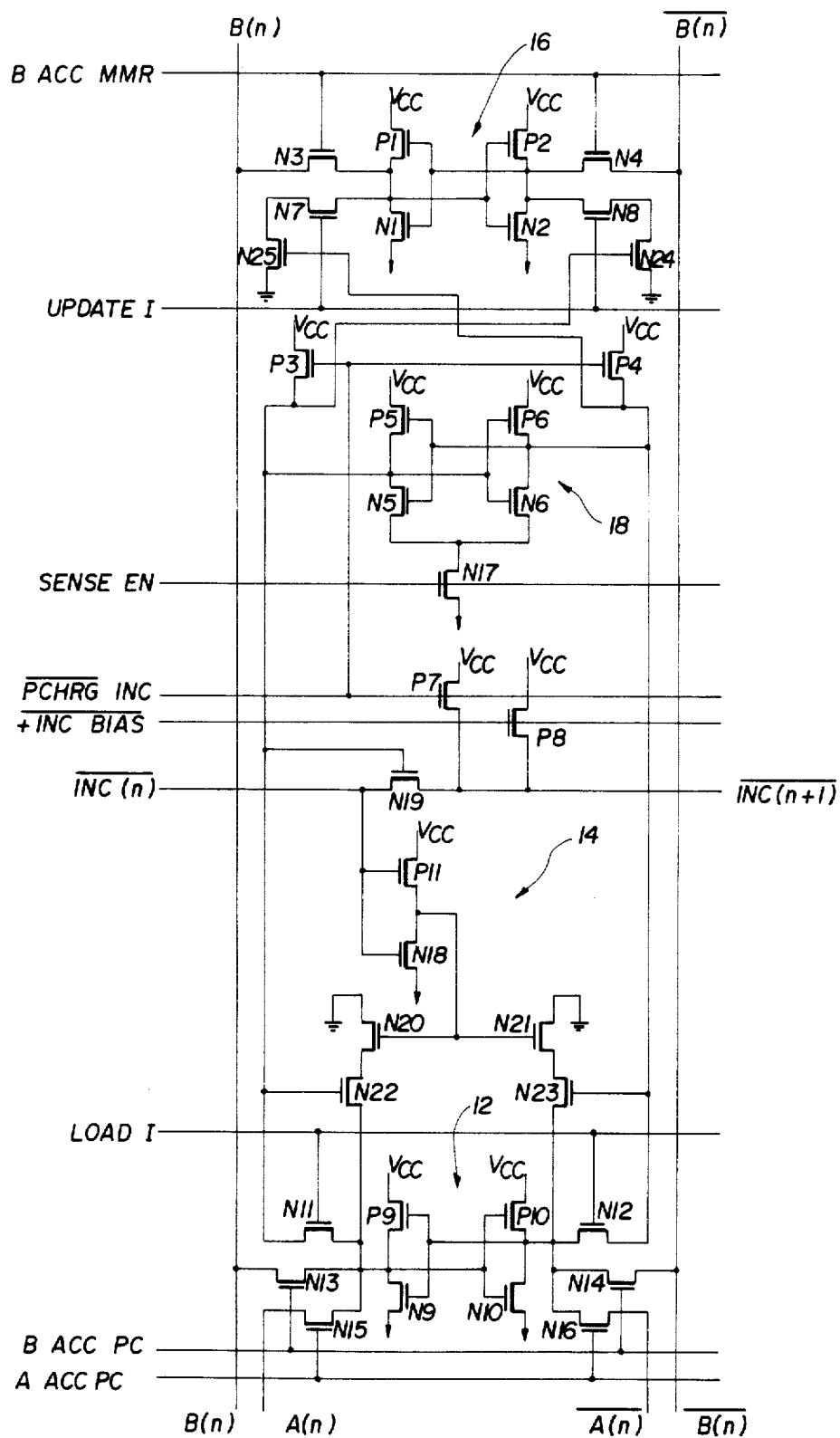
FIG. 2 is a schematic diagram of an integrated program counter, memory management register and incrementer incorporating the principles of the present invention.

An integrated structure 10, as shown in FIG. 1, includes a program counter 12 and incrementer 14, a memory management register 16 and a sense amplifier 18. The external access to the program counter 12 and the memory management register 16 are provided by the B bus having B and $\bar{B}$ rails. External access to the program counter 12 is also provided by the A bus having A and $\bar{A}$ rails. The program counter 12, incrementer 14, memory management register 16 and sense amplifier 18 are connected to an internal bus I having the rails I and $\bar{I}$.

The access or connection of the program counter 12 to the A bus is provided by a control signal on the A ACCESS PC bus. The access or connection of the program counter 12 to the B bus is provided by a control bus B ACCESS PC. The access or connection of the program counter 12 to the internal bus I is provided by a control bus LOAD I.

The incrementer 14 has an increment input signal on terminal $\overline{INC\ (N)}$ and has an increment output signal terminal $\overline{INC\ (N+1)}$. The incrementer 14 is also connected to the program counter 12 to increment the logic value of the program counter when the program counter 12 is not connected to the internal bus I. As will be explained more fully below, the incrementer 14 increments the program counter 12 when an increment signal is provided on its input terminal $\overline{INC\ (N)}$ and a logic high is on the I bus.

Sense amplifier 18 is activated by a control bus SENSE EN which enables the sense amplifier to sense the value of the program counter 12 as written onto the I bus and maintain this value on the I bus to assure writing of this logic value into the memory management register 16 as well as to aid the incrementer 14.

The access or connection of the memory management register 16 to the B bus is provided by a control bus B ACCESS MMR. The access of memory management register 16 to the internal bus I is controlled by control bus UPDATE I.

Figure 4:
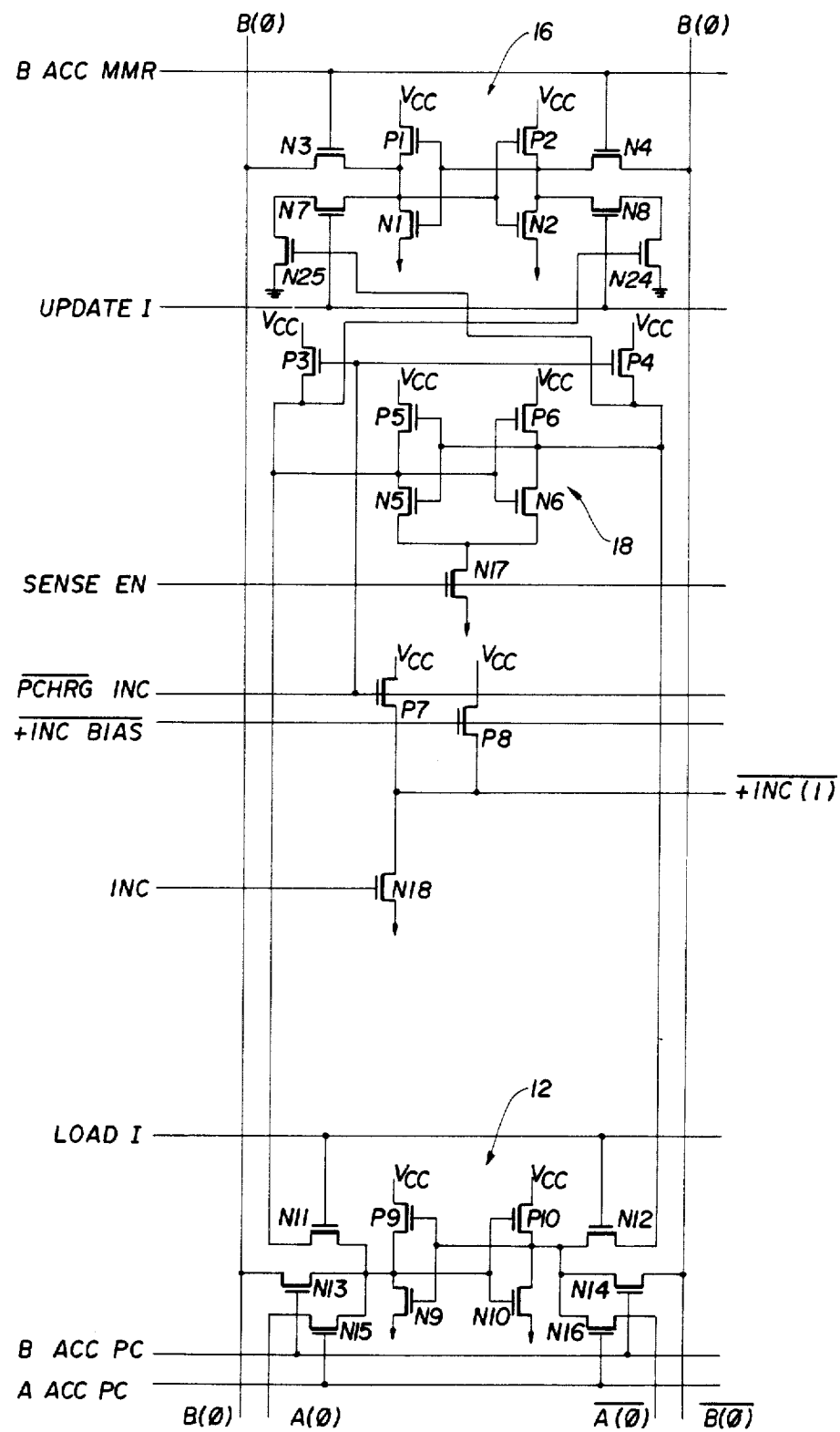
FIG. 4 is a schematic of an integrated program counter and memory management register without incrementing capability incorporating the principles of the present invention.

Before describing the specific circuitry of FIGS. 2 and 4, the overall sequential operation of the integrated program counter, memory management register and increment of FIG. 1 will be described. Initially, the internal I bus is precharged then the LOAD I bus is activated to connect the program counter 12 to the internal bus I. This provides the logic value of the program counter 12 onto the internal bus I. Once the signal on the internal bus has had a sufficient time to obtain the appropriate logic value of the program counter 12, the sense enable signal on SENSE ENABLE bus activates the sense amplifier 18 to sense the values on the internal bus I. The sense amplifier is enabled to maintain the logic values on I bus to write in the memory management register 16 and for the operation of the incrementer 14. Simultaneously or shortly thereafter, the memory management register 16 is provided access to the internal bus I by a signal on the UPDATE I control bus. This writes the logic value of the program counter 12 which is on internal bus I into the memory management register 16.

The program counter 12 is then disconnected from the internal bus I by a signal on the LOAD I control bus. An increment signal is then provided which may be transmitted on the increment $\overline{INC\ (N)}$ control terminal of incrementer 14. The presence of this signal conditionally sets up incrementer 14 and depending upon the logic value on the internal bus I will increment the program counter 12. Since program counter 12 is disconnected from internal bus I, the program counter 12 can be updated without varying the contents of the internal bus I. Also, as a safety precaution, the memory management register 16 is disconnected from the internal bus I by a signal on the UPDATE I control bus for a majority of the cycle of the incrementer 14. The incrementer 14 provides an increment output signal on control bus INC (N+1) depending upon the logic value of the I bus and receipt of an increment signal on $\overline{INC\ (N)}$ bus. The cycle is concluded with deactivation of the sense amplifier 18 and the incrementer 14.

The integrated circuit 10 is a single cell or a digit of a multi-digit cell register. Thus, the control buses A ACCESS PC, B ACCESS PC, LOAD I, SENSE ENABLE, UPDATE I, B ACCESS MMR are shown as continuous buses which would interconnect the plurality of cells. The increment $\overline{INC\ (N)}$ is shown as an input signal to increment circuit 14 from the previous stage and provides an output increment signal $\overline{INC\ (N+1)}$ to the next stage.

The incrementer works on the concept that an increment signal is provided on the first stage and the incrementer upon receipt of the increment signal will increment the program counter 12 if it has received an increment signal. The incrementer circuit 14 will provide an increment signal on the output $\overline{INC\ (N+1)}$ if it has received an increment signal and if the logic value of the program counter before incrementing was a logic high. If the increment circuit 14 receives an increment signal on the $\overline{INC\ (N)}$ input bus, and the logic value of the program counter 12 before incrementing is zero, it will increment the program counter 12 but will not provide an output signal on increment output $\overline{INC\ (N+1)}$. Thus, all subsequent stages will not be incremented since it will not receive an increment signal on the increment input control bus $\overline{INC\ (N)}$.

The overall timing of the signals and the operation of the internal bus I is illustrated in the graphs of FIG. 3 and includes some additional graphs which will be discussed in detail with reference to the schematic of FIG. 2. It should be noted that the program counter 12 may be read onto the internal bus I at the same time that it is read onto the A and B buses to be used in the ALU. The writing of the logic value of the program counter 12 into the memory management register 16 and the incrementing of the program counter subsequently thereto may be achieved while the arithmetic logic unit is performing other operations. Thus, a special cycle is not needed to read the program counter into the memory management register and to increment the program counter. Also, the ALU and the A and B buses are not needed and are free for further operations of the arithmetic logic unit. Normally, the A bus is a read/write bus such that not only can the contents of the programmer counter 12 be read but special next instruction addresses may be provided or written into the program counter 12. Normally, the B bus is a read-only bus allowing reading of the program counter 12 and the management memory register 16, although it may also be a read/write bus.

Turning your attention to the schematic of the integrated circuit in FIG. 2, the program counter 12 is illustrated as a pair of cross-coupled CMOS inverters including N9, P9, N10 and P10 forming a flip-flop. FET switches N15 and N16 connect the program counter 12 to the A bus rails A and $\overline{A}$, respectively, and have their gates connected to the control bus A ACCESS PC. FET switches N13 and N14 connect the program counter 12 to the B bus rails B and $\overline{B}$, respectively, and have their gates connected to control bus B ACCESS PC. FET switches N11 and N12 connect the program counter 12 to the internal bus rails I and $\overline{I}$, respectively, and have their gates connected to the control bus LOAD I. The operation of the cross-coupled inverters as a flip-flop are well-known and will not be discussed in detail. Input signals will write into the flip-flop and the logic levels can be read from the flip-flop.

The incrementer 14 is shown as including a CMOS inverter including devices P11 and N18 having the input connected to the $\overline{INC\ (N)}$ input terminal and their output connected to the gates of a pair of devices N20 and N21. The N channel devices N20 and N21 have their sources connected to ground and their drains connected to the sources of N channel devices N22 and N23 whose drains are connected to the program counter 12. The gates of the switches N22 and N23 are connected to the internal bus I and $\bar{I}$, respectively. Since the gate of N22 and N23 sense the value on the I bus for incrementing the program counter 12 instead of directly writing the inverse of the I bus and switch N11 and N12 disconnect the program 12 counter from the I bus, the program counter 12 is totally isolated from the I bus during incrementing.

Upon the receipt of a true $\overline{INC}$ signal, which is a low logic signal, N18 is cut-off and P11 is turned on providing VCC at the gates of N20 and N21. This provides a ground at the sources of N22 and N23. Depending upon the value on the I and $\bar{I}$ bus, only one of the transistors N22 or N23 will be turned on. For example, if the I rail is high and $\bar{I}$ bar rail is low, N22 is turned on providing a grounded input to the inverters P10 and N10, turning on P10 and off N10 and storing a logic low in the program counter 12. Thus, the previous contents of the program counter which is a logic high is now a logic low. This is the normal operation incrementation wherein the complementary value is stored depending upon whether there is a increment signal received from the previous stage. If a logic low was previously stored in the program counter 12, the $\bar{I}$ bus would be high activating N23 which would ground the input to P9 and N9 allowing P9 to be activated and thereby storing a logic high in the program counter 12.

The incrementer 14 also includes required circuitry to transmit an increment signal to the next stage. This includes specifically an increment transmission switch N19 having its source-drain path connected between the $\overline{INC\,(N)}$ input and the $\overline{INC\,(N+1)}$ output and its gate connected to the I rail of the internal bus. Also connected to the output increment terminal $\overline{INC\,(N+1)}$ are precharge MOS transistor P7 and increment bias P channel device P8. The sources of each of the devices are connected to a logic high voltage VCC and their gates are connected to receive a precharge signal $\overline{PCHRG}$ and an increment bias signal $\overline{INCBIAS}$ signal, respectively. This allows precharging of the output terminal $\overline{INC\,(N+1)}$ and maintaining the precharge bias via P8. The presence of a logic high or a VCC signal on the output increment bus $\overline{INC\,(N+1)}$ which is an input to the next stage activates N18 of the next stage which grounds the gates to the transistors N20 and N21 and, thus, disables the incrementer of the subsequent stage.

With a logic low signal on the increment input bus $\overline{INC\,(N)}$ and a logic high on the I bus, indicating that the pre-increment value of the program counter was logic high, the transistor N19 is activated and the logic low or ground is connected to the output terminal $\overline{INC\,(N+1)}$ and thereby bring the output to logic low dissipating the VCC signal from P8. If an increment signal on the input of any stage $\overline{INC\,(N)}$ is a logic low and the I rail is a logic low indicating a pre-increment value of a logic low in the program counter 12, the incrementer inverter P11 and N18 activate the remainder of the incrementer circuit and the program counter 12 is incremented but N19 is not activated and, consequently, the logic high value from P8 is provided on the output increment bus $\overline{INC\,(N+1)}$ and thereby prevents incrementation of all subsequent stages.

The sense amplifier 18 is illustrated as a pair of cross-coupled CMOS inverters having devices P5, N5, P6 and N6. The inverter is connected to the ground by a N channel MOS device N17 whose gate is controlled by the sense enable bus SENSE ENABLE. This allows the sense amplifier 18 to be activated and deactivated by the sense enable control bus. Precharge transistors P3 and P4 are provided on the internal bus rails I and $\bar{I}$, respectively, and their gates are controlled by the precharge signal $\overline{PCHRG}$ to precharge the I bus before the program counter 12 is read onto the rails.

The memory management register 16 is illustrated as including a pair of cross-coupled CMOS inverters having devices P1, N1, P2 and N2. The memory management register is connected to the B bus rails B and $\bar{B}$ by N channel MOS devices N3 and N4, respectively. The memory management register 16 is connected or provided access to internal bus I by pairs of N channel devices N7, N25 and N8, N24. The devices N7 and N25 and N8 and N24 have their source and drains connected in series between ground and the input to the memory management register 16. The gates of N7 and N8 are connected to the UPDATE I control bus. The gate of transistor N25 is connected to the internal $\bar{I}$ rail and the gate of N24 is connected to the internal I rail.

During the cycle when the value of the I bus is to be written into the memory management register, a high signal on the UPDATE I control bus is high turning on N7 and N8. The value of the I bus on rails I and $\bar{I}$ activate either N24 or N25, grounding the respective input terminal of an memory management register 16 and thereby writing the contents therein. To be more specific, if the I rail is high indicating the logic high on the I bus, N24 is activated providing a grounded or a logic low signal through N24 and N8 to the input of P1 and N1 which activates P1 and thereby providing a logic high in the memory management register 16. If a logic low was on the internal bus I indicating a pre-incremented low in the program counter 12, $\bar{I}$ is high and N25 is activated providing a low through N25 and N7 to the input of inverter P2, N2 activating P2 and storing a logic low in the memory management register 16.

It should be noted that by providing the interconnection between the internal bus I and the memory management register 16 by connecting I bus to the gates of N24 and N25, the memory management register 16 is isolated from the I bus and, therefore, no extraneous signal or leakage current would change the contents of the memory management register 16 through N25 or N24. Similarly, by using separate gated switches N7 and N8, the memory management register 16 is further isolated from the I bus. This is similar to the structure of the increment transistors N20, N21, N22 and N23 wherein N20 and N21 has to be activated initially to provide a logic signal and the gates of N22 and N23 are connected to the I bus. Thus, the increment input to the program counter 12 is isolated from the I bus and any extraneous signal thereon.

Normally an inverter could be provided to produce the initial increment signal $\overline{INC\,(1)}$. In some applications, the program counter is increment by counts of two and, therefore, the first stage would not need the increment logic 14. The schematic of such a stage is illustrated in FIG. 4. The integrated structure includes the program counter 12, the sense amplifier 18 and the memory management register 16 connected as it was and having the same elements as that of FIG. 2. The incrementer 14 is greatly reduced in structure and includes the precharge transistor P7 and the bias transistor P8 for the increment output bus $\overline{INC\,(1)}$. The transistor N18 is provided having its drain connected to the output $\overline{INC\,(1)}$ bus and its source connected to ground. The increment input signal INC is provided to the gate of N18 which grounds the output $\overline{INC\,(1)}$ for a logic high INC and allows the VCC of bias device P8 to provide a logic high output for a logic low INC. Thus, N18 acts as an inverter providing an inverted logic output $\overline{INC}$ (1) for the input INC. This removes the need of an additional inverter circuit and can be built into the non-incrementing first stage of a integrated program counter, memory management register, and increment structure.

The graphs of FIG. 3 are for the circuit of FIG. 2 and provide and include the $\overline{PCHRG}$ signal which is low causing precharging from T0 to T50 and high for the remainder of the cycle. The contents of the program counter is read onto the I bus by the LOAD I signal being high after precharge from T75 to T125. The SENSE ENABLE is activated after the program counter 12 has been connected to the bus sufficiently long for the proper values to be read thereon and is high from T100 to T200 or the end of the cycle. The memory management register 16 is activated by the UPDATE I signal which goes high at the same time that the SENSE ENABLE signal goes high and is maintained on from T100 to T150. The input increment signal $\overline{INC}$ may be high during the total period depending upon the previous stage or may be high from T0 to T125 and then go low to allow incrementation of the program counter 12. The internal I bus may be high during the total cycle if the program counter is a logic high or may be written low by the program counter after the precharge cycle from T50 to T200. The increment bias signal $\overline{INCBIAS}$ is D.C. voltage sufficient to turn P8 on only sufficient to provide any leakage current on the $\overline{INC}$ (N+1) node in order to maintain $\overline{INC}$ (N+1) output signal high if the increment input signal $\overline{INC}$ (N) is high or the I bus is a logic low.

Although the present invention has been described and illustrated in detail, it is clearly understood that the same is by way of example and illustration only and is not to be taken by way of limitation. Although the invention has been described for a program counter and a memory management register, it is obvious that these were names used in a specific computer architecture and may represent any two storage elements wherein the contents of one is to be maintained in a second prior to incrementation and the contents of the first is to be incremented. The spirit and scope of the present invention are to be interpreted only in terms of the appended claims.

What is claimed is:

1. An integrated program counter, memory and incrementer cell comprising:
    program counter means;
    memory storage means;
    a first data bus means connected to said program counter means and said memory storage means for providing external access to said program counter means and said memory storage means;
    second data bus means connected to said program counter means and said memory storage means for providing access to said program counter means for reading and to said memory storage means for writing;
    sense means connected to said second data bus means for sensing a logic value of said program counter means on said second data bus means and maintaining said logic value on said second bus means; and
    increment means, connected to said second bus means and said program counter means and having an input increment terminal, for reading said logic value on said second data bus means and writing an incremented logic value in said program counter means when said program counter means is disconnected from said second data bus means in response to an increment signal on said increment signal input terminal.

2. An integrated cell according to claim 1 including means for interconnecting said program counter means and said second data bus means for reading only.

3. An integrated cell according to claim 1 including means for interconnecting said memory storage means and said second data bus means for writing only.

4. The integrated cell according to claim 3, wherein said interconnecting means includes a first and second switch means each having a first and second terminal and a control terminal, said first and second switch means having said first and second terminals connected in series between a logic value signal source and said memory storage means, said control terminal of said first switch means is connected to a write enable signal source, said control terminal of said second switch means is connected to said second data bus means for writing said signal source logic value in said memory storage means as a function of the logic value of said second data bus means.

5. An integrated cell according to claim 1 including means for connecting said program counter means to said first data bus means for reading and writing and means for connecting said memory storage means to said first data bus means for reading only.

6. An integrated cell according to claim 1 including a third data bus providing exterior access to said cell and means for interconnecting said program counter means and said third data bus for reading and writing.

7. An integrated cell according to claim 6 including means for interconnecting said program counter means and said first data bus means for reading only and means for interconnecting said memory storage means and said first data bus means for reading only.

8. The integrated cell according to claim 1, wherein said increment means includes an increment output terminal and means for providing an output increment signal on said increment output terminal when said increment means writes a logic low in said program counter means.

9. The integrated cell according to claim 8, wherein said output increment signal providing means includes a switch means connected between said increment input and output terminals and a control terminal connected to said second data bus means for activating said switch means to transmit an increment signal from said increment input terminal to said increment output terminal for a read logic high on said second data bus means.

10. An integrated register, memory and incrementer structure comprising:
    first data bus means for providing external access to said integrated structure;
    second data bus means for providing internal access to said integrated structure;
    register means controllably connected to said first and second data bus means;
    memory means controllably connected to said first and second data bus means;
    sense means connected to said second data bus means for sensing a logic value on said second data bus means;
    increment means connected to said second data bus means and said register means for incrementing said register means in response to an increment signal and said logic value of said second data bus means; and control means connected to said register, memory, sense and increment means for connecting said register means to said second bus means to read a logic value of said register means onto said second bus means, for activating said sense means to sense said logic value of said register means on said second bus means, for connecting said memory means to said second bus means to write said logic value on said second bus means into said memory means, for disconnecting said register means from said second bus means and for providing an increment input signal to said increment means.

11. In an integrated structure according to claim 10, wherein said control means control the interconnection of said register and memory means and said first data bus means to control external access thereto for reading and writing.

12. An integrated structure according to claim 10, wherein said increment means provides an output increment signal as a function of said increment input signal and said logic value on said second data bus means.

13. An integrated structure according to claim 10, wherein said control means maintains said sense means activated for a duration of a period when said memory means is connected to said second data bus means and a duration of said increment input signal so that said sense means maintains a pre-incremented logic value of said register means on said second bus means.

* * * * *